(12) United States Patent
Manganaris et al.

(10) Patent No.: US 7,475,405 B2
(45) Date of Patent: Jan. 6, 2009

(54) METHOD AND SYSTEM FOR DETECTING UNUSUAL EVENTS AND APPLICATION THEREOF IN COMPUTER INTRUSION DETECTION

(75) Inventors: Stefanos Manganaris, Durham, NC (US); Keith Hermiz, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 09/749,095

(22) Filed: Dec. 27, 2000

(65) Prior Publication Data

US 2002/0082886 A1 Jun. 27, 2002

Related U.S. Application Data

(60) Provisional application No. 60/230,486, filed on Sep. 6, 2000.

(51) Int. Cl.
*G06F 3/00* (2006.01)
*G06F 9/44* (2006.01)
*G06F 9/46* (2006.01)
*G06F 13/00* (2006.01)
*G06F 17/00* (2006.01)
*G06F 11/00* (2006.01)
*G06F 12/14* (2006.01)
*G06F 12/16* (2006.01)
*G06F 15/18* (2006.01)
*G06N 5/00* (2006.01)
*G06N 5/02* (2006.01)
*G08B 23/00* (2006.01)

(52) U.S. Cl. .................. 719/318; 706/45; 706/46; 706/47; 706/48; 726/22; 726/23; 714/26

(58) Field of Classification Search ................ 719/318; 705/39, 10; 713/201; 379/114.14; 726/22–23; 714/26; 707/6; 706/45–48
See application file for complete search history.

(56) References Cited

U.S. PATENT DOCUMENTS

| | | | | |
|---|---|---|---|---|
| 6,014,647 A | * | 1/2000 | Nizzari et al. | 705/39 |
| 6,134,664 A | * | 10/2000 | Walker | 713/201 |
| 6,208,720 B1 | * | 3/2001 | Curtis et al. | 379/114.14 |
| 6,618,766 B1 | * | 9/2003 | Eshghi | 719/318 |

OTHER PUBLICATIONS

Lee et al., "Learning Patterns from Unix Process Execution Traces for Intrucion Detection," Jul. 1997.*
Lee et al., "Mining in a Data-flow Environment: Experience in Network Intrusion Detection," Aug. 1999.*

(Continued)

*Primary Examiner*—Thomas Lee
*Assistant Examiner*—Qing-Yuan Wu
(74) *Attorney, Agent, or Firm*—Saul Ewing LLP; John R. Pivnichny

(57) ABSTRACT

An automated decision engine is utilized to screen incoming alarms using a knowledge-base of decision rules. The decision rules are updated with the assistance of a data mining engine that analyzes historical data. "Normal" alarm events, sequences, or patterns generated by sensors under conditions not associated with unusual occurrences (such as intrusion attacks) are characterized and these characterizations are used to contrast normal conditions from abnormal conditions. By identifying frequent occurrences and characterizing them as "normal" it is possible to easily identify anomalies which would indicate a probable improper occurrence. This provides very accurate screening capability based on actual event data.

6 Claims, 6 Drawing Sheets

OTHER PUBLICATIONS

Mannila et al., "Discovery of Frequent Episodes in Event Sequences," 1997, Kluwer Academic Publishers. pp. 259-289.*

Forrest et al., "A Sense of Self for Unix Processes," 1996, IEEE, pp. 120-128.*

Anderson et al., "Next-generation Intrusion Detection Expert System," 1995, pp. 1-37.*

ICSA Intrusion Detection Systems Consortium, "An Introduction to Intrusion Detection and Assessment," (1999).

CNN.com, "eToys attacks show need for strong Web defenses," .cnn.com/1999/TECH/computing/12/21/etoys.attack.idg/index.html, (Dec. 21, 1999).

PC Week, "Return of the Ping of Death," 8.zdnet.com/eweek/news/0630/01eping.html, (Jul. 1, 1997).

Lee et al., "Mining Audit Data to Build Intrusion Detection Models," pp. 1-11 (no other information available).

* cited by examiner

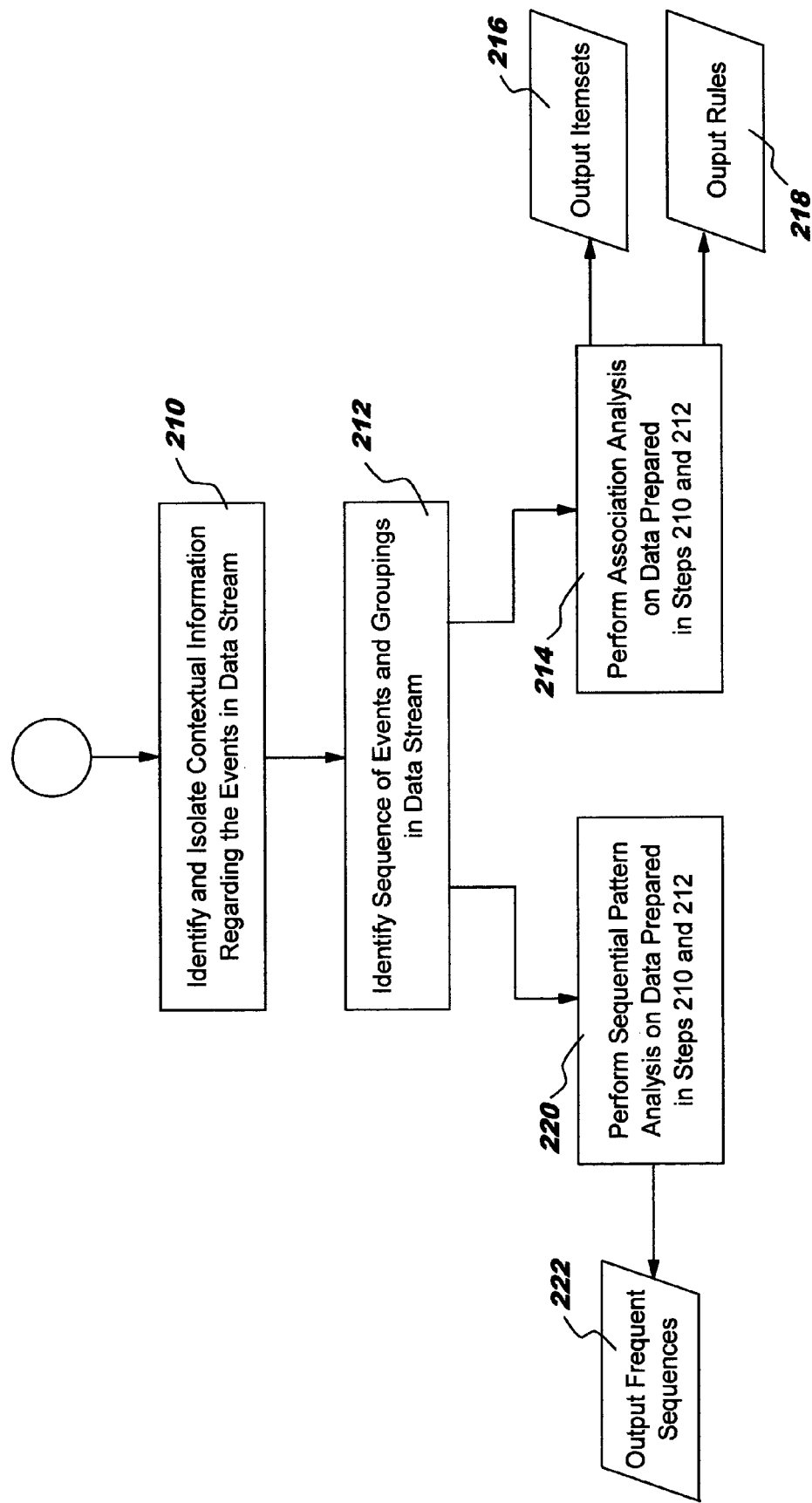

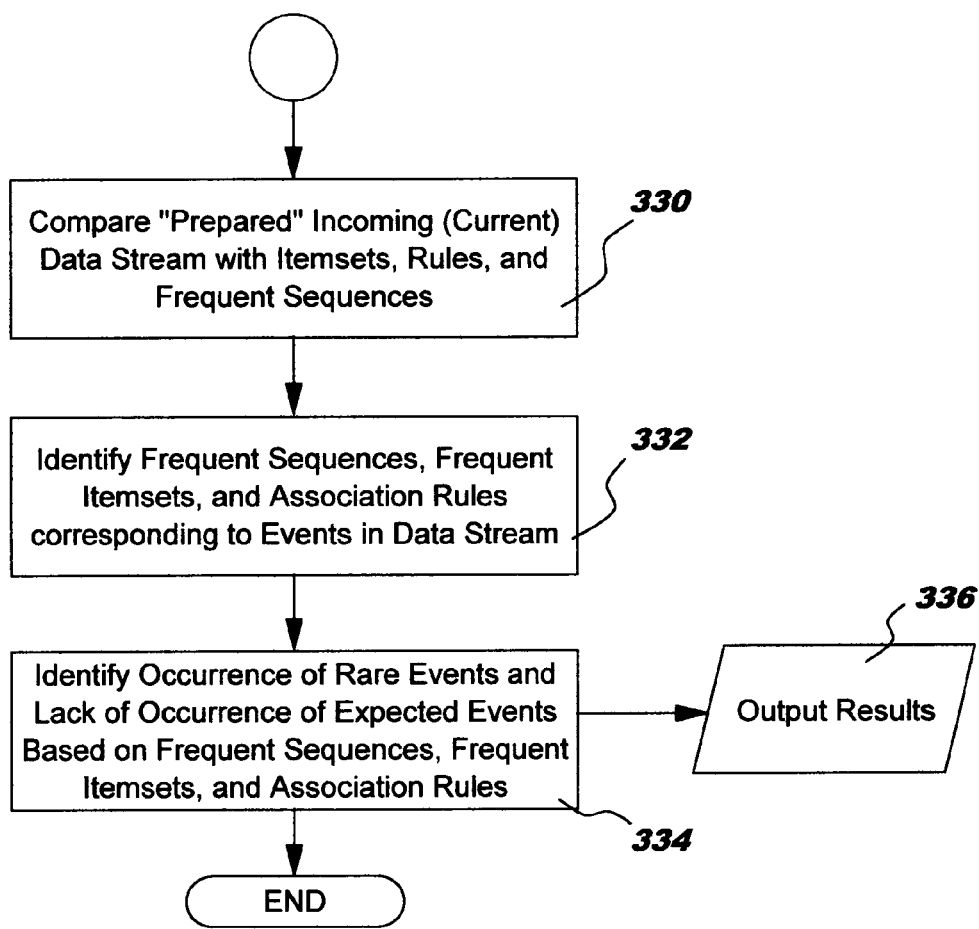

FIG. 4

Inputs: (1) model of normal sensor behavior: set of frequent itemsets F and
set of association rules R
(2) stream of alarm bursts from sensor Outputs: information about alarm bursts that deviate from normal behavior

```
LOOP
    let B be the next burst of alarms
    IF there is a frequent itemset s in F such that s=B THEN
            report B as frequent
    ELSE
            let M be the set of most specific supported itemsets in F for B
            report itemsets m_i in M as combinations of alarms that are not known
to co-occur frequently within the same burst
            let D be the set of alarms in B that are not in any of the most specific
supported itemsets m_i in M
            IF D is not empty THEN
                    report alarms in D as rare alarms
            END
    END
    check rules R and report any unexpected absences of alarms in B
END
```

METHOD AND SYSTEM FOR DETECTING UNUSUAL EVENTS AND APPLICATION THEREOF IN COMPUTER INTRUSION DETECTION

CROSS REFERENCE TO RELATED APPLICATIONS

This application claims priority to Provisional Application No. 60/230,486, filed Sep. 6, 2000, and incorporated fully herein by reference.

BACKGROUND OF THE INVENTION

1. Field of the Invention

The present invention relates to a method and system of data mining and, more particularly, to a method and system of data mining for identifying the occurrence of unusual events.

2. Description of the Related Art

Organizations collect huge volumes of data from their daily operations. This wealth of data is often under-utilized. Data mining is a known technology used to discover patterns and relationships in data. It involves the process of analyzing large amounts of data and applying advanced statistical analysis and modeling techniques to the data to find useful patterns and relationships. These patterns and relationships are used to discover key facts that can drive decision making. This helps companies reap rewards from their data warehouse investments, by transforming data into actionable knowledge and by revealing relationships, trends, and answers to specific questions that cannot be easily answered using traditional query and reporting tools.

Data mining, also known generically as "knowledge discovery," is a relatively young, interdisciplinary field that cross-fertilizes ideas from several research areas, including machine learning, statistics, databases, and data visualization. With its origins in academia about ten years ago, the field has recently captured the imagination of the business world and is making important strides by creating knowledge discovery applications in many business areas, driven by the rapid growth of on-line data volumes. Fayyad et al. ("From Data Mining to Knowledge Discovery: An Overview," in Chapter 1, *Advances in Knowledge Discovery and Data Mining*, American Association for Artificial Intelligence (1996)) presents a good, though somewhat dated, overview of the field. Bigus (*Data Mining with Neural Networks*, McGraw-Hill (1996)) and Berry and Linoff (*Data Mining Techniques: For Marketing, Sales, and Customer Support*, John Wiley & Sons (1997)), among others, have written introductory books on data mining that include good descriptions of several business applications.

With the widespread use of networked computers and the Internet, "electronic attacks" on such systems have become a serious problem. These unauthorized intrusions into computer systems and networks place unfortunate limitations on the users of the network systems, erode consumer confidence in providing confidential information to utilize such systems (e.g., for use in electronic commerce) and require the implementation of expensive and often cumbersome security measures to limit or stop such intrusions.

Intrusion detection systems have been developed to collect information from a variety of system and network sources and analyze the information for signs of unauthorized access to the system or network. A detailed white paper published by the ICSA Intrusion Detection Systems Consortium in the spring of 1999, entitled "An Introduction to Intrusion Detection and Assessment", incorporated herein fully by reference, provides a detailed discussion of the benefits and limitations of intrusion detection systems.

Commercial intrusion-detection systems (also referred to as "sensors" herein) often generate massive amounts of data. The data generally comprises "alarms" and sequences of alarms; the alarms merely indicate the occurrence of an event on the network or system. The occurrence of an alarm does not necessarily indicate that an intrusion event has occurred. An intrusion would likely generate many alarms or a particular sequence of alarms, which in their totality would indicate an intrusion and possibly generate a higher level "intrusion alarm." Users of these systems use simple filters to screen alarms in order to cope with their sheer volume; little else is usually done with this data.

A good example of a user of intrusion detection systems is IBM. IBM provides real-time intrusion detection services to clients worldwide. Commercially available sensors, such as NetRanger from Cisco Systems, are deployed on customer networks. These sensors detect the occurrence of a variety of events which in turn trigger alarms. All alarms are sent over the Internet to IBM's Network Operations Center (NOC) in Boulder, Colo., which provides 7×24 first-level monitoring and database storage of the alarms. Operators at the NOC deal with thousands of incoming alarms from each sensor every day, using sophisticated filtering and summarization tools to determine in real-time the extent and source of potential attacks, i.e., to determine which alarms or alarm sequences indicate intrusion events. The filtering and summarization tools are typically developed in-house on an ad hoc basis and comprise tools that deal with the following: (i) receiving alarms as they come in from various sources around the world; (ii) translating alarms to a standard, vendor-independent format using internally-developed mapping tables and rules; (iii) assigning priority levels to alarms based on internally-developed static tables and rules; (iv) storing alarms into a database mainly for forensic purposes; (v) updating summary-level data (e.g., keeping a count of various alarm types); (vi) filtering alarms based on the assigned priority levels and summary thresholds; and (vii) presenting filtered streams of alarms and updated summaries to human operators so that the operators can decide whether an intrusion incident is occurring.

Even though these tools perform admirably, the success of their use depends critically on careful hand-crafting of the filtering and summarization rules. As the number of sensors deployed increases, the data volume rises, and this task becomes harder to keep up with. By necessity, most manually crafted rules are fairly simple, placing a lot of weight on priority levels statically pre-assigned to different alarm types and largely ignoring the context in which the alarms occur, such as precursor or successor alarms, the source or destination of the network traffic triggering the alarms, the timing of events, and the originating sensor. This is problematic, since it is often the context that determines the severity of an alarm or sequence of alarms, and failure to consider the context leads to one or both of (a) many false positive alarms or (b) many false negative alarms.

Accordingly, it would be desirable to have a method and system for identifying (a) commonly occurring events, event sequences, and event patterns and (b) their corresponding context occurring in a historical data set, such as frequently-occurring alarm events in an intrusion detection system that are not, in fact, indicia of unusual events, and based on these identified event sequences or patterns, identifying unusual events, sequences, or patterns occurring in a current data set.

SUMMARY OF THE INVENTION

An automated decision engine is utilized to screen incoming alarms using a knowledge-base of decision rules. The decision rules are updated with the assistance of a data mining engine that analyzes historical data. "Normal" alarm events, sequences, or patterns generated by sensors under conditions not associated with unusual occurrences (such as intrusion attacks) are characterized and these characterizations are used to contrast normal conditions from abnormal conditions. By identifying frequent occurrences and characterizing them as "normal" it is possible to easily identify anomalies which would indicate a probable improper occurrence. This provides very accurate screening capability based on actual event data.

DESCRIPTION OF THE DRAWINGS

FIG. 2 illustrates an example of the operations performed in the modeling step 102 of FIG. 1;

FIG. 3 illustrates an example of the steps performed by steps 104 and 106 of FIG. 1;

FIG. 4 illustrates an exemplary algorithm which can be used for detecting deviations from normal behavior in accordance with the present invention;

DETAILED DESCRIPTION OF THE INVENTION

The present invention takes advantage of the fact that frequent behavior, over extended periods of time, is likely to indicate normal behavior. A combination of specific alarm types occurring within seconds from each other, always in the same order, every few minutes, for an extended time period, is most likely less suspicious than a sudden burst of alarms rarely or never before seen in a particular context.

Figure 1:
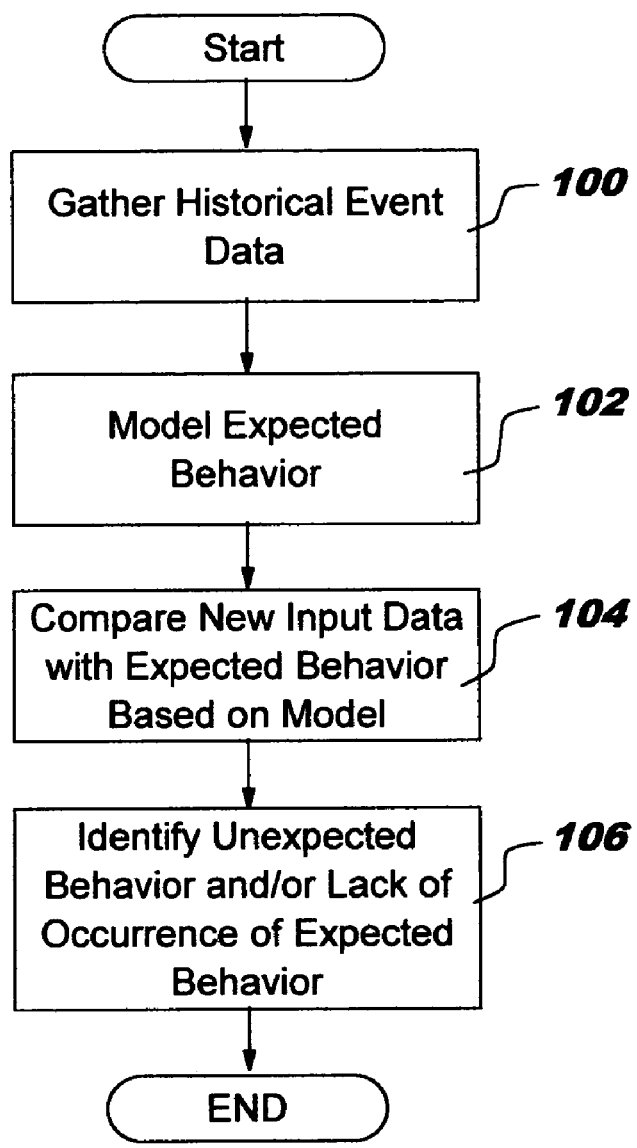
FIG. 1 illustrates an overview of the functional operation of the system for identifying the occurrence of unusual events in accordance with the present invention.

FIG. 1 illustrates an overview of the functional operation of a system for identifying the occurrence of unusual events in accordance with the present invention. While the examples given herein are directed to an intrusion detection environment, the present invention is not limited to such an application, and it is clear that the principles and methods of the present invention can find application in numerous other settings including medical, pharmaceutical, insurance, and any other environment in which it is desirable to identify the occurrence of unusual events from within groupings or sequences of events.

Steps 100 and 102 of FIG. 1 collectively perform an operation referred to herein as "adaptive modeling of expected behavior;" steps 104 and 106 collectively perform an operation referred to herein as "model-based deviation detection." At step 100, historical event data is gathered for analysis. The event data can comprise a series of individual event alarms, a series of event alarm groupings (referred to herein as "bursts"), or a combination of single events and event bursts. At step 102, expected or "normal" behavior is modeled based upon the historical event data gathered in step 100. Using the modeled behavior from step 102, at step 104 new input data (referred to herein as "current data" or "the current data stream") is compared with the modeled behavior and, based upon this comparison, at step 106 unexpected event occurrences and/or the lack of the occurrence of expected behaviors are identified, thereby identifying or "screening out" normal behavior from unusual behavior. The events identified as being unusual are then used to trigger alarms to alert others of the unusual behavior.

FIG. 2 illustrates in more detail an example of the operations performed in the modeling step 102 of FIG. 1. Steps 210 and 212 illustrate a process referred to herein as "preparing" the data for further processing. As shown in FIG. 2, at step 210, contextual information regarding the historical events data is identified and isolated. Depending on the type of events occurring in the data, the specific parameters used for this identification and isolation step will vary. For example, in the context of identifying insurance fraud from a group of insurance claims, information for each event or claim, such as a request for payment for a laboratory analysis or an office visit, might be gathered and categorized. With respect to a particular lab analysis claim, information regarding the medical history of the patient, the age, sex, height, and weight of the patient, the expected diagnosis, etc. might be gathered. Similarly, in the context of intrusion detection in a network, details regarding each alarm event might be gathered, such as details regarding the activity that caused the alarm, the meaning of the activity, the time that the activity occurred, and the source of the activity. Regardless of the application of use, the identification and isolation step involves the compiling of attributes of the event that can be used to categorize the event according to those attributes.

At step 212, the historical data is associated with its time of occurrence as compared to the rest of the data sequence, so that the sequence of the data input, i.e., its relation in time to the other data elements, is identified.

At step 214, conventional association analysis is performed on the data prepared in steps 210 and 212, treating simultaneous events or event groupings and their attributes as elements in a market basket. Attributes of events can be embedded into the description of elements in preparation for association analysis, in a manner analogous to that disclosed in commonly-assigned U.S. patent application Ser. No. 09/507,004. Further, aggregate attributes of the basket can be embedded as imaginary items into the basket, in a manner analogous to that disclosed in commonly-assigned U.S. patent application Ser. No. 09/510,416. Examples of attributes of events include the source or destination address of the event. Examples of aggregate attributes of the basket include the time of day, day of week, operating mode of the monitored network, etc. For the purposes of this analysis, events may be considered simultaneous and belonging to the same event grouping when in fact the time of their respective occurrence is identical, or suitably close in time and their ordering in time is deemed irrelevant for the application at hand.

By way of brief summary, "market basket analysis" or "association analysis" reveals patterns in the form of "association rules" or "affinities." An association rule between products A and B can be expressed symbolically as A→B which translates to the statement: "Whenever product A is in a market basket, then product B tends to be in the market basket as well." This is an example of "product dynamics," i.e., the effect of the purchase of one product on another product. Association rules are typically generated when the product pair A and B appear often enough in the market baskets to be of interest and at such point they are referred to as a "frequent itemset."

There are a number of measures that have historically been used to characterize the importance of a particular association rule. In the context of market basket analysis, these measures are calculated in relation to all market baskets under consideration. The "confidence" of a rule "A→B" is the probability that if a basket contains A it will also contain B. The "support" of a rule is the frequency of occurrence of the rule in the set of all transactions. The "lift" of the rule is a measure of the predictive power of the premise A. Lift is a multiplier for the probability of B in the presence of A versus the probability of B without any prior knowledge of other items in the market basket.

In the context of event and/or alarm analysis, normal alarm behavior can be characterized in terms of the frequent itemsets and association rules as follows. First, the continuous stream of alarm data, in sequential order, can be partitioned into bursts of alarms. Alarm bursts may be identified/defined in any known manner. For example, the time between adjacent alarms can be sensed, with the beginning and end of the bursts occurring whenever a predetermined time threshold between adjacent alarms is exceeded. This defines a "window of event activity" which window, in the context of alarms, defines an "alarm burst."

Frequent itemsets refer to combinations of alarms that tend to occur often within a burst. Association rules relate the occurrence of one set of alarms with another set of alarms in the same burst. In market basket analysis parlance, each burst corresponds to a "transaction", and each individual alarm is analogous to an item in the market basket. Alarms and sets of alarms that tend to occur often within bursts are considered "frequent itemsets". Association rules are then determined to relate the occurrence of one set of alarms with another within the same alarm burst. The collection of frequent itemsets and association rules with "high confidence" identify "normal behavior" within alarm bursts for a particular sensor.

Itemsets resulting from this analysis are output at step 216 and rules resulting from this association analysis are output at step 218. The association analysis as employed herein (1) identifies frequent events and their corresponding context as frequent itemsets and (2) identifies relationships between the many data events as association rules. Thus, for example, in the insurance example given above, a relationship between testing procedures performed to identify a particular condition, e.g., obesity, will be correlated with statistical information regarding the patients on whom the tests are being performed, thereby establishing itemsets identifying frequent combinations of tests and their corresponding context in which they occur, and rules linking physical characteristics of patients who typically would be having tests for obesity performed to the particular tests themselves. Similarly, in the data intrusion environment, itemsets are established that identify frequent combinations of alarms and the corresponding context in which they occur and rules linking alarms and/or corresponding operations that frequently occur together in normal operation of a network. An example of association analysis as applied in the present invention to intrusion detection follows. "Denial-of-service" attacks involve the flooding of a website with sham requests that block legitimate requests. These attacks have received significant media attention in view of their ability to shut down entire websites at particularly inopportune times (e.g., on-line retailer eToys was attacked in December of 1999 during the Christmas rush). A particular type of denial-of-service attack called "the ping of death" is a denial-of-service attack that crashes servers by sending invalid IP ping packets and/or by sending modified ping packets that indicate that there is more data in the packet than there actually is. This causes the server to freeze because the IP stack is waiting for the rest of the (non-existent) data.

These attacks involve a type of Internet traffic called ICMP traffic. The following alarms are related to ICMP traffic:
2000 "ICMP Echo Rply"
2001 "ICMP Unreachable"
2002 "ICMP Src Quench"
2003 "ICMP Redirect"
2004 "ICMP Echo Req"
2005 "ICMP Time Exceed"
2006 "ICMP Param Prob"
2007 "ICMP Time Req"
2008 "ICMP Time Rply"
2009 "ICMP Info Req"
2010 "ICMP Info Rply"
2011 "ICMP Addr Msk Req"
2012 "ICMP Addr Msk Rply"
2150 "Fragmented ICMP"
2151 "Large ICMP"
2152 "ICMP Flood"
2153 "ICMP Smurf attack"

An example of "normal" behavior relating to ICMP traffic is captured by the following association rule: [large ICMP]=> [fragmented ICMP], with support 5%, confidence 95% and lift of 30. Both of these alarms indicate that something is wrong with ICMP packets on the network: too big in one case, and smaller or broken in the other. These alarms tend to occur together (they are a frequent itemset); in fact 5% of the bursts contain these two alarms. The frequency of this behavior makes it unlikely that it is truly suspicious. Moreover, 95% of the time you have large ICMP traffic, you also have fragmented ICMP traffic. In fact, it's 30 times more likely to see fragmented ICMP if you have large ICMP traffic. The underlying mechanism that explains this pattern may have to do with a particular set of processes and the configuration of the monitored network.

What could be considered suspicious, however, is a deviation from this pattern. For instance, observing "large ICMP" with "ICMP flood" instead of the more common "fragmented ICMP" alarm might indicate a change in the underlying mechanisms, perhaps because of intrusion behavior. There are two unusual behaviors in this example: (i) unexpected absence of "fragmented ICMP" traffic, and (ii) unexpected occurrence of "ICMP flood." What is significant is that "large ICMP" and "ICMP flood" may both be frequent when considered independently. It may be that only the combination of the two within a burst is rare, in other words, it is the context that makes a difference between normal/abnormal. The approach of the present invention identifies the context in which alarms occur frequently, and based on these findings flags unusual occurrences.

At step 220, conventional sequential pattern analysis is also performed on the data prepared in steps 210 and 212, treating simultaneous events and their attributes as elements in a market basket, as is done in association analysis, and, in addition, treating sequences of such baskets that have some common element as single transaction groups for the purpose of this analysis. The choice of an appropriate element to tie baskets together into transaction groups varies based on the domain of the application. For example, in the context of intrusion detection, an appropriate element might be the source and/or destination address of the TCP/IP packets associated with the alarms; in the context of insurance claims, an appropriate element might be the identity of the patient. Frequent sequences are identified and output at step 222. The purpose of step 220 is to identify commonly occurring sequences of data events or data patterns occurring in the historical data, thereby allowing them to be considered as being "normal" events which present no need to trigger an alarm.

While FIG. 2 shows separate paths for association analysis (block 214) and sequential pattern analysis (block 22), they can be performed serially instead, if desired.

FIG. 3 illustrates details of the steps performed by steps 104 and 106 of FIG. 1. The essential purpose of these steps is to compare the current data stream with the patterns resulting from steps 100 and 102. At step 330 of FIG. 3, the incoming current stream, which has been "prepared" in the same manner that the historical event data was prepared in step 100, is compared with the item sets, rules, and frequent sequences developed by steps 214 and 220 of FIG. 2. Given an event and the context in which it occurred, the method attempts to identify frequent sequential patterns, frequent itemsets, and association rules that match the events and their corresponding context in the data stream (step 332). If such patterns can be found, this would indicate a high probability of occurrence (in other words, they are expected to occur during normal operations). At step 334, rare events (i.e. those that occur in the current data stream but, based upon the frequent item sets and sequences identified in step 332, are rarely expected to occur) are identified as probable "true" alarm conditions and an unusual condition alarm is triggered. Likewise, at step 334 events or event sequences that are expected to occur, based on the association rules identified in step 332, but which do not occur, are also identified and an unusual condition alarm is triggered due to the lack of occurrence of these events. These results are output at step 336 and the unusual condition alarms are then analyzed to determine why the events are, or are not, occurring.

As a result of the above-described process, the monitoring of the alarms can be focused on those events that are unusual in their occurrence, thereby minimizing the expenditure of time and effort on monitoring normal activity.

An exemplary algorithm which can be used for detecting deviations from normal behavior is shown in FIG. 4. Given a set of frequent itemsets, high confidence rules, and an incoming burst of alarms, a determination is made first as to whether the set of alarms in the burst is a known frequent itemset. If a frequent itemset is identified, the alarms in the burst are likely to be an innocent set of alarms, with expected frequency of occurrence equal to the support of the itemset as estimated by the association analysis. If no frequent itemset is identified, then the set M of "most specific" supported itemsets is identified. A frequent itemset is supported by a burst of alarms, when it is a subset of the alarms in the burst. for example, the itemset {abc} is supported by burst {abcde} because {abc} is a subset thereof. A supported frequent itemset is most specific when no other frequent itemset that is a superset of it is also supported. For instance, in the example above, itemset {a} is not most specific, because {ab} is a superset of {a} and {ab} is also supported by the burst. Itemset {abc} is most specific if no other superset of it that is supported by the burst is a frequent itemset.

The set M shows combinations of alarms that are known to occur, independently of each other, frequently within bursts, but are not known to co-occur. This is one type of an anomaly where the context in which alarms occur is of importance. The set D contains any alarms not covered by any of the patterns in M. When D is not empty, we have a burst that contains alarms that occur with frequency lower than the minimum support threshold in any context.

Another type of anomaly involves the unexpected absence of alarms. This is where association rules come into play. Any high-confidence rule A→C such that A is supported in a burst while C is not, indicates that the set of alarms C, which was known to frequently occur in the particular context, is unexpectedly missing. A measure of interestingness of this anomaly is the probability of the event. The probability of the absence of C given A is equal to 1-confidence (A→C). If A→C with a confidence of 90%, then the probability of C not occurring in the context of A is 10%.

To set the minimum support threshold, the frequency of any known innocent alarms is considered. The higher the threshold, the fewer the frequent itemsets, and thus the fewer the alarm bursts that can be assigned a precise estimate on the frequency of occurrence. More and more bursts would be flagged as anomalies, raising the rate of false positives while lowering the rate of false negatives. Regarding the minimum confidence threshold, higher values produce fewer, more confident, rules. Broken high-confidence rules are more interesting than broken low-confidence rules. The higher the confidence threshold, the fewer bursts are flagged as anomalies because of broken rules, lowering the rate of false positives and raising the rate of false negatives.

Figure 5:
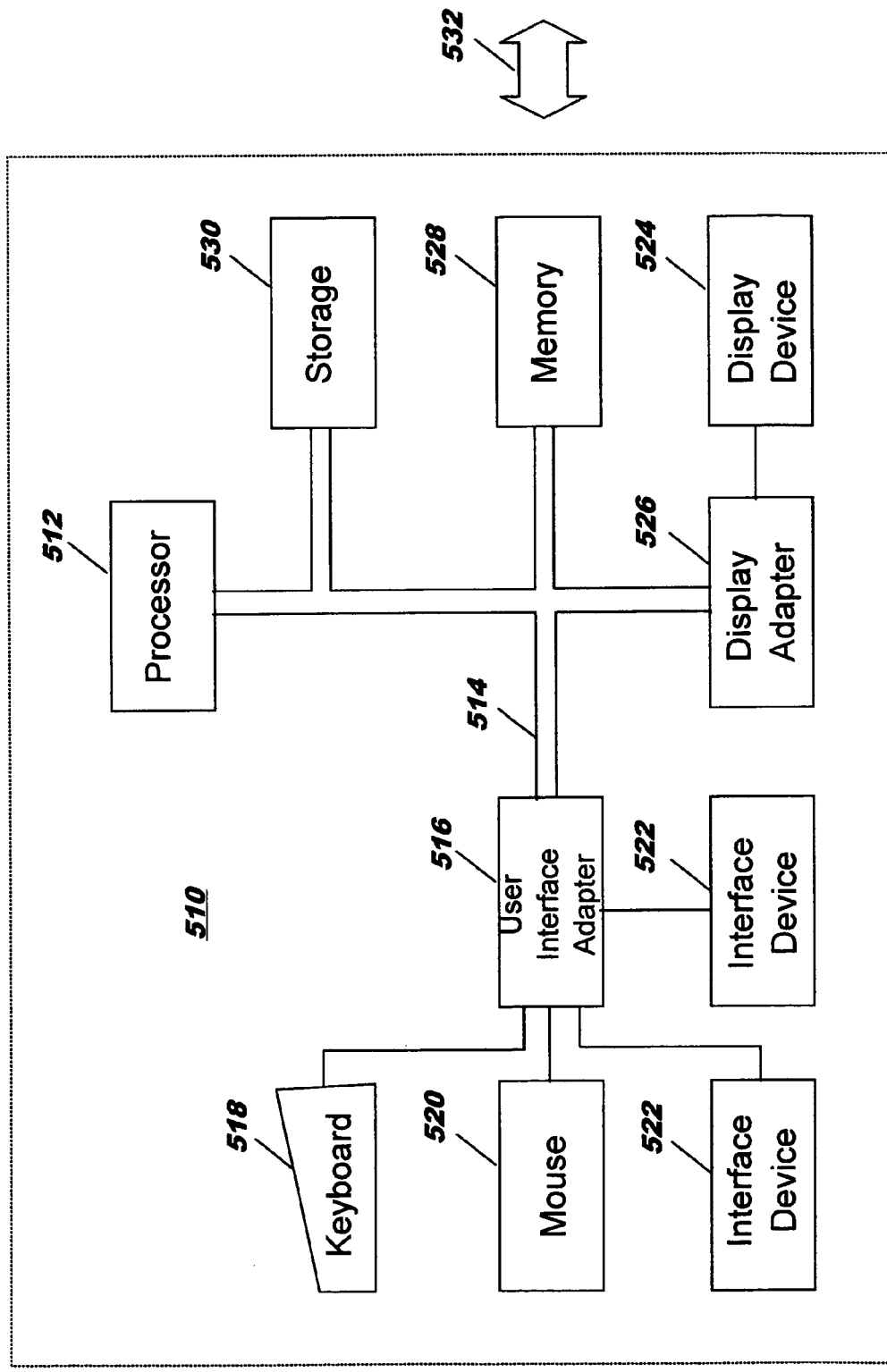
FIG. 5 illustrates a representative work station hardware environment in which the present invention may be practiced.

FIG. 5 illustrates a representative workstation hardware environment in which the present invention may be practiced. The environment of FIG. 5 comprises a representative single user computer workstation 510, such as a personal computer, including related peripheral devices. The workstation 510 includes a microprocessor 512 and a bus 514 employed to connect and enable communication between the microprocessor 512 and the components of the workstation 510 in accordance with known techniques. The workstation 510 typically includes a user interface adapter 516, which connects the microprocessor 512 via the bus 514 to one or more interface devices, such as keyboard 518, mouse 520, and/or other interface devices 522, which can be any user interface device, such as a touch sensitive screen, digitized entry pad, etc. The bus 514 also connects a display device 524, such as an LCD screen or monitor, to the microprocessor 512 via a display adapter 526. The bus 514 also connects the microprocessor 512 to memory 528 and long term storage 530 which can include a hard drive, tape drive, etc.

The workstation 510 communicates via a communications channel 532 with other computers or networks of computers. The workstation 510 may be associated with such other computers in a local area network (LAN) or a wide area network, or the workstation 510 can be a client or server in a client/server arrangement with another computer, etc. All of these configurations, as well as the appropriate communications hardware and software, are known in the art.

Figure 6:
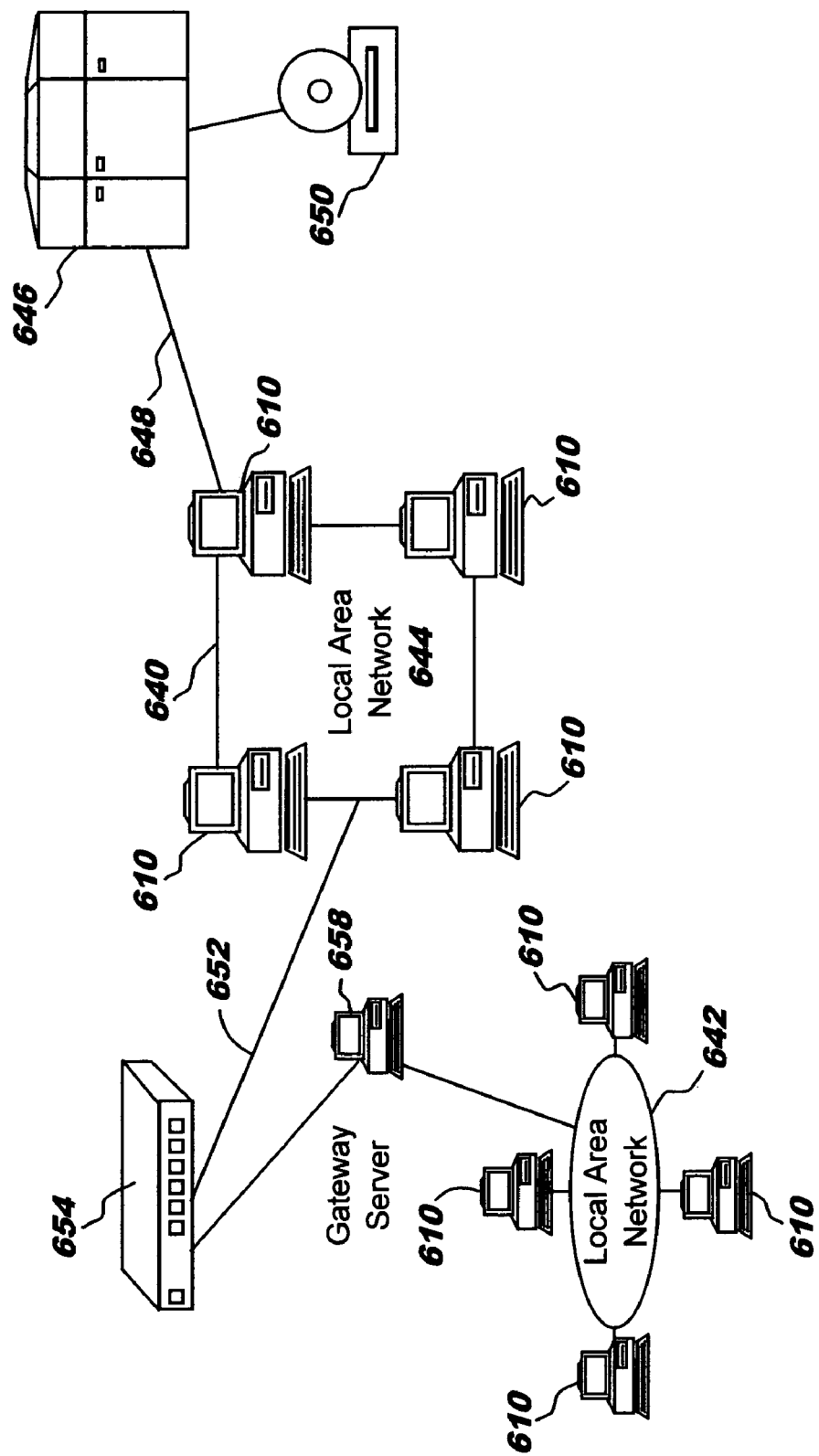
FIG. 6 illustrates a data processing network in which the present invention may be practiced.

FIG. 6 illustrates a data processing network 640 in which the present invention may be practiced. The data processing network 640 includes a plurality of individual networks, including LANs 642 and 644, each of which includes a plurality of individual workstations 610. Alternatively, as those skilled in the art will appreciate, a LAN may comprise a plurality of intelligent workstations coupled to a host processor.

Still referring to FIG. 6, the data processing network 640 may also include multiple mainframe computers, such as a mainframe computer 646, which may be preferably coupled to the LAN 644 by means of a communications link 648. The mainframe computer 646 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 646 may also be coupled to a storage device 650, which may serve as remote storage for the LAN 644. Similarly, the LAN 644 may be coupled to a communications link 652 through a subsystem control unit/communication controller 654 and a communications link 656 to a gateway server 658. The gateway server 658 is preferably an individual computer or intelligent workstation which serves to link the LAN 642 to the LAN 644.

Those skilled in the art will appreciate that the mainframe computer 646 may be located a great geographic distance from the LAN 644, and similarly, the LAN 644 may be located a substantial distance from the LAN 642. For example, the LAN 642 may be located in California, while the LAN 644 may be located in Texas, and the mainframe computer 646 may be located in New York.

Software programming code which embodies the present invention is typically stored in permanent storage of some type, such as the permanent storage 530 of the workstation 510. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The above-described data mining system and its individually described elements may be implemented in various computing environments. For example, the present invention may be implemented on a conventional IBM PC or equivalent, multi-nodal system (e.g., LAN) or networking system. All programming, algorithms, GUIs, display panels and dialog box templates, metadata and data related thereto are stored in computer memory, static or dynamic, and may be retrieved by the user in any of: conventional computer storage, display (i.e., CRT) and/or hardcopy (i.e., printed) formats.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A computer-implemented method of adaptively generating frequent event patterns as an expected behavior model by processing event data to detect the occurrence of unusual events, said method comprising the steps of:
   receiving a historical event data set wherein said historical event data comprises individual event alarms, a series of event alarm groupings or a combination of single event and event groupings as well as context information including historic conditions present when an event occurred;
   identifying a context in which each event in said historical event data set occurred and categorizing each event according to its identified context;
   performing pattern analysis on said historical event data set and the identified context of the events in said historical data set to generate frequent event patterns based on said historic event data wherein said pattern analysis step comprises:
      performing association analysis on said historical event data set and the identified context of the events in said historical event data set to generate association rules and frequent itemsets based on the event occurrences within a window of event activity as said frequent event patterns;
      performing sequential pattern analysis on said historical event data set and the identified context of the events in said historical event data set to generate commonly occurring sequence of data events or data patterns as said frequent event patterns, wherein the association analysis and sequential pattern analysis are perform serially;
   receiving a current event data set wherein said current event data set comprises new input data;
   identifying a context in which each event in said current event data set occurred and categorizing each event according to its identified context;
   comparing said frequent event patterns to said current event data set and the identified context of the events in said current event data set to identify event occurrences in said current event data set that do not correspond to any of said frequent event patterns, wherein said comparing step comprises applying said commonly occurring sequence of data events or data patterns, said association rules and frequent itemsets to said current event data set including an analysis of the context in which an event occurred as compared to historic conditions of when similar events occurred; and
   outputting an unusual event indication whenever an event occurrence in the current event data set that does not correspond to any of said frequent event patterns is identified.

2. A method as set forth in claim 1, wherein said event occurrences that do not correspond to any of said frequent event patterns comprise the sequences of data occurring in a particular context within said current event data set, where (a) the sequences contain data not usually seen in the particular context, or (b) data frequently seen in the particular context is missing.

3. A method as set forth in claim 1, wherein said event occurrences that do not correspond to any of said frequent event patterns comprise combinations of data occurring in a particular context within said current event data set, where (a) the combinations of data within a window of event activity are not usually seen in the particular context, or (b) data frequently seen in the particular context is missing.

4. A method as set forth in claim 1, wherein said unusual events comprise suspicious intrusions in a computer network.

5. A computer-implemented method of adaptively generating frequent event patterns as an expected behavior model by detecting unusual events, comprising the steps of:
   identifying a context in which each event in a historical data set (HDS) occurred and categorizing each event according to its identified context wherein said HDS comprises individual event alarms, a series of event alarm groupings or a combination of single event and event groupings as well as context information including historic conditions present when an event occurred;
   performing pattern analysis on said historical data set and the identified context of the events in said historical data set to generate frequent event patterns based on said historic event data wherein said pattern analysis step comprises:

performing association analysis on said historical data set and the identified context of the events in said historical data set to generate association rules and frequent itemsets based on the event occurrences within a window of event activity as said frequent event patterns;

performing sequential pattern analysis on said historical data set and the identified context of the events in said historical data set to generate commonly occurring sequence of data events or data patterns as said frequent event patterns, wherein the association analysis and sequential pattern analysis are perform serially;

detecting event occurrences in a current data set (CDS) that do not correspond to the frequent event patterns by comparing the generated frequent event patterns of said HDS, with events occurring in said CDS and a categorized context in which each event in the current event data set occurred, wherein said CDS comprises new input data; and outputting an unusual event indication whenever any event occurrences in said CDS that do not correspond to the frequent event patterns are detected.

6. A computer-implemented method of adaptively generating frequent alarm event patterns as an expected behavior model by detecting suspicious intrusions in a computer network, comprising the steps of:

identifying a context in which each event in a historical data set occurred and categorizing each event according to its identified context wherein said historical data set comprises individual event alarms, a series of event alarm groupings or a combination of single event and event groupings as well as context information including historic conditions present when an event occurred;

performing pattern analysis on said historical data set and the identified context of the events in said historical data set to generate frequent alarm event patterns based on said historic event data wherein said pattern analysis step comprises:

performing association analysis on said historical data set and the identified context of the events in said historical event data set to generate association rules and frequent itemsets based on the event occurrences within a window of event activity as said frequent alarm event patterns;

performing sequential pattern analysis on said historical event data set and the identified context of the events in said historical data set to generate commonly occurring sequence of data events or data patterns as said frequent alarm event patterns, wherein the association analysis and sequential pattern analysis are perform serially;

detecting alarm event occurrences in a current data set (CDS) that do not correspond to said frequent alarm event patterns by comparing the generated frequent alarm event patterns of said historical data set, with alarm events occurring in said CDS and a categorized context in which each alarm event in said CDS occurred, wherein said CDS comprises new input; and outputting an indication of a suspicious intrusion whenever any alarm event occurrences in said CDS that do not correspond to the frequent alarm event patterns are detected.

* * * * *